Oct. 7, 1969 E. W. HOLMAN ET AL 3,471,657

ECHO SUPPRESSOR HAVING MEANS FOR ELIMINATING THE OPERATIONALLY INDUCED NOISE FLUCTUATIONS

Filed Nov. 21, 1966

INVENTORS E. W. HOLMAN
J. E. UNRUE, JR.
BY Daniel D. Dubosky
ATTORNEY

United States Patent Office 3,471,657
Patented Oct. 7, 1969

3,471,657
ECHO SUPPRESSOR HAVING MEANS FOR ELIMINATING THE OPERATIONALLY INDUCED NOISE FLUCTUATIONS

Erwin W. Holman, Summit, and John E. Unrue, Jr., Freehold, N.J., assignors to Bell Telephone Laboratories, Incorporated, Murray Hill, N.J., a corporation of New York

Filed Nov. 21, 1966, Ser. No. 595,943
Int. Cl. H04b *3/20*
U.S. Cl. 179—170.6 13 Claims

ABSTRACT OF THE DISCLOSURE

A full echo suppressor is described in which the incoming signal from the far-end party is connected through a limiter circuit during those intervals when this incoming signal is suppressed to inhibit an echo signal. The limiter circuit is constructed so as to couple all parts of the signal having levels equal to or lower than the incoming noise level to the near-end party. A frequency doubling circuit within the limiter destroys the intelligibility of whatever echo signal remains after limiting.

Figure 1:
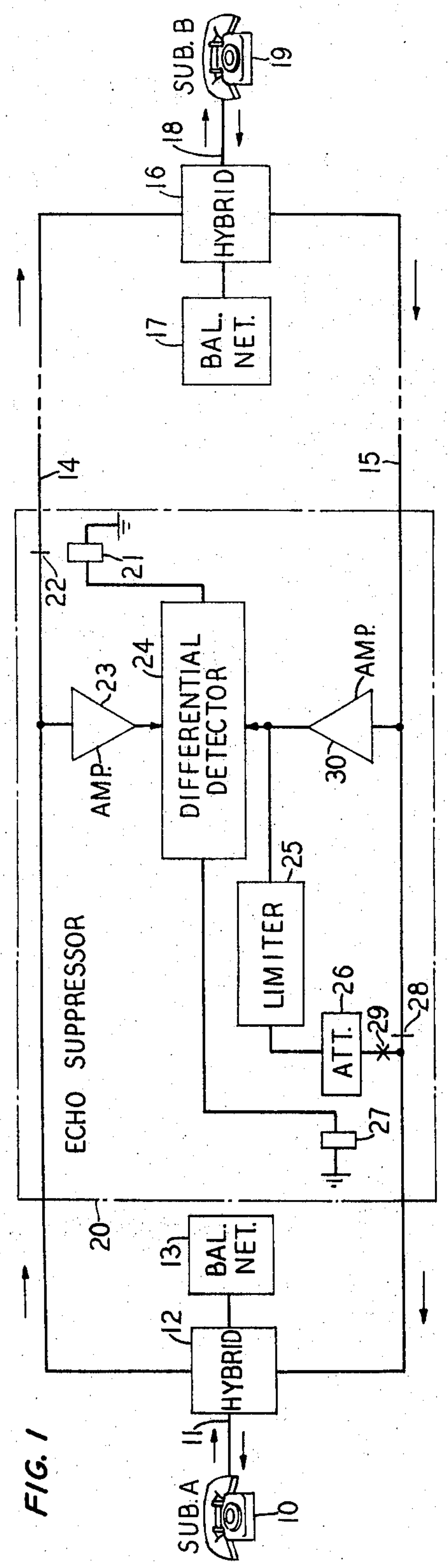

This invention relates to echo suppressor apparatus and more particularly to so-called full echo suppressor apparatus which is situated entirely at one end of a two-way communications system having incoming and outgoing one-way paths.

Where telephone subscribers are located at great distances from each other, they are usually connected by a combination of two-wire facilities, where the same path is used for transmission in both directions, and four-wire facilities where separate paths are used for transmission in each direction. A hybrid network is used at each end of the four-wire transmission facility to connect it to the two-wire facility. A balancing network is connected to each of the hybrid networks in order to provide an impedance matching that of the two-wire facility. Since differences exist between two-wire facilities, the desired impedance match is not always provided at each hybrid, and as a result, echoes frequently occur in the four-wire transmission system. To eliminate the annoying effect of these echoes in long haul facilities, a speech activated circuit called an echo suppressor is usually employed in the four-wire facility. If the echo suppression apparatus is situated entirely at one end of the four-wire facility, it is called a full echo suppressor; if it is separated into two separate units with one at each end of the four-wire facility, each unit is appropriately called a split echo suppressor. In either type of echo suppressor the method of eliminating the echo is essentially identical, that is to disable the receiving path of each subscriber when he is transmitting.

Where the four-wire transmission system is of considerable length, that is, in the order of 2,500 miles, the amount of noise which is contributed by the four-wire facility becomes a significant part of the total noise heard by each subscriber. In the case of split echo suppressors, this noise is still heard by the transmitting subscriber even during echo suppressor operation since it is the echo suppressor at the far end of the four-wire facility which disables his receiving path. Where a full echo suppressor is used, however, operation of the echo suppressor by the subscriber closest to the echo suppressor causes this noise to be removed from his receiver, thereby causing a significant drop in his received noise level. This noise cut causes the near end subscriber to believe that the system has been disconnected, and to the annoyance of both subscribers, much time is wasted in making circuit checking comments.

It is accordingly a primary object of the present invention to eliminate the operationally induced noise cut which is heard by the subscriber closest to a full echo suppressor.

Another object of the present invention is to eliminate this noise cut by using as simple and inexpensive a circuit as possible.

These objects and other objects are achieved in accordance with the present invention by a by-pass circuit which is connected in a full echo suppressor in parallel with the disabling means associated with the receiving path of the near end subscriber. This by-pass circuit is activated during suppressor operation by the near end subscriber in order to transmit only the received noise to the near end subscriber. The by-pass circuit contains a limiter to clip and reject those signals which are above the normal level of the received noise. In order to destroy the intelligibility of what little echo is present after limiting during intervals when the received noise is slightly lower than the clipping level, the by-pass circuit also contains a frequency doubling circuit for the purpose of distorting the incoming signal.

Figure 2:
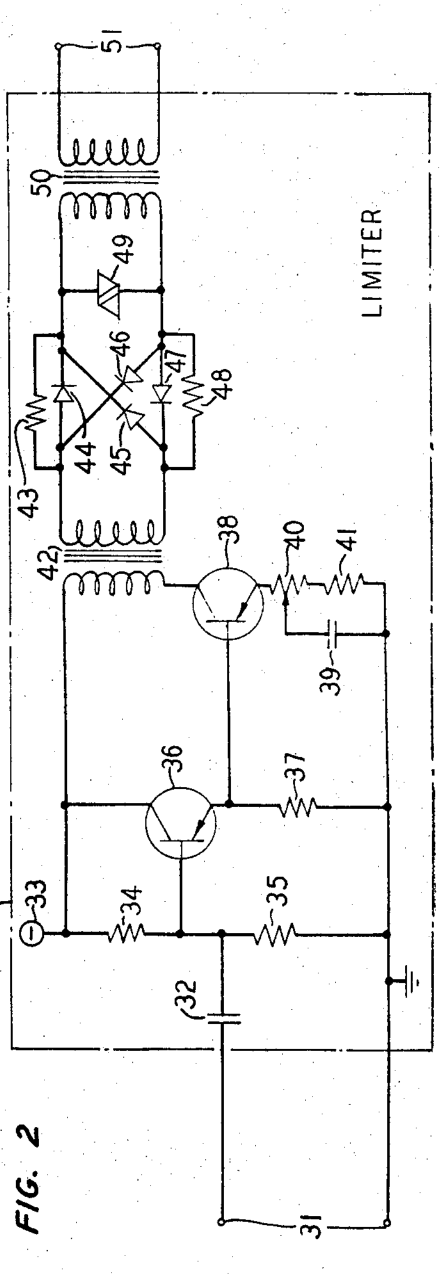

The attendant features and operation of the instant invention will be better appreciated after a consideration of the following detailed description, in combination with the attached drawings, wherein:

FIG. 1 is a schematic block diagram of a transmission system containing an echo suppressor constructed in accordance with the present invention; and FIG. 2 is a detailed schematic diagram of the limiter 25 shown in the echo suppressor shown in FIG. 1.

In FIG. 1 the transmission paths shown as single wires actually represent two wires in the transmission system. For example, subscriber line 11 between subset 10 of subscriber A and hybrid 12, and subscriber line 18 between subset 19 of subscriber B and hybrid 16 appear as single lines in FIG. 1.

The four-wire transmission system consisting of the two unidirectional paths 14 and 15 is connected by way of hybrids 12 and 16 to subscriber lines 11 and 18 respectively. Balancing networks 13 and 17 are connected to hybrids 12 and 16 respectively to provide each hybrid with a close match to the impedance of a subscriber line. The signal transmitted by subscriber B over subscriber line 18 is connected by hybrid 16 to the unidirectional path 15. At the other end of unidirectional path 15, amplifier 30 couples the signal from subscriber B to one input of differential detector 24. In the absence of a speech signal on path 14 from subscriber A, differential detector 24 operates relay 21 thereby opening the normally closed contact 22 in path 14, the receiving path for subscriber B. In this way the signal which is coupled from path 15 through hybrid 12 to path 14 as a result of the residual imbalance not compensated by network 13 will not return by way of path 14 to subscriber B as an echo signal. Since subscriber B is the far end subscriber, that is to say, he is at a distance further than subscriber A from the echo suppressor, the noise inherently introduced in the extended transmission path 14 is not removed by echo suppressor operation from the signal which is heard by subscriber B. Consequently, subscriber B does not experience a significant drop in received noise level during the intervals when his speech has activated echo suppressor 20.

When subscriber A transmits a signal by way of line 11 and hybrid 12 over transmission path 14, amplifier 23 couples this speech signal to a second input of differential detector 24 thereby causing detector 24 to operate relay 27 which in turn causes normally closed contact 28 to open and disable the conventional path for transmission along path 15. In the absence of the by-pass circuit composed of limiter 25, attenuator 26, and contact 29 of relay 27, the opening of contact 28 not only removes any echo produced by the imbalance at hybrid 16 from the signal received by subscriber A, but also removes the noise from that signal which is inherent to the long portion of transmission path 15 between hybrid 16 and echo suppressor 20. In the operation of the system of FIG. 1 as thus far described, subscriber A will experience an unfamiliar annoying noise cut during the intervals when he transmits and actuates the echo suppressor.

In accordance with the invention, transmission along path 15 to subscriber A (FIG. 1) is not totally disabled during suppressor operation. The signal received and amplified by amplifier 30 is coupled to limiter 25 which clips and rejects all portions of the signal having an amplitude greater than a predetermined level. The signal at the output of limiter 25 is coupled by way of attenuator 26 through contact 29 of relay 27 to path 15 during the intervals when normally closed contact 28 has been opened. The predetermined level at which clipping takes place is chosen such that no portion of the signal having an amplitude greater than $2\sigma$ ($\sigma$=standard deviation) higher than the mean level noise at the input to amplifier 30 will be permitted to return by way of contact 29 to path 15. As a result, except for the rarely occurring intervals during which the noise at the input to amplifier 30 exceeds the mean level plus $2\sigma$, all of the noise on path 15 will be coupled through to subscriber A even when normally closed contact 28 has been opened. The echo on the other hand will continue to be largely rejected by the clipping action of limiter 25. The small amount of echo signal which is passed during the large majority of the time when the noise level is less than the clipping level of limiter 25 is rendered substantially unintelligible and thus to resemble noise by a frequency doubling circuit placed in limiter 25 for the purpose of distortion. The frequency doubling circuit does not discernibly alter the character of the noise since the latter has an essentially flat frequency spectrum.

A detailed schematic diagram of limiter 25 is presented in FIG. 2 of the drawings. The output of amplifier 30 of FIG. 1 is connected to input terminals 31 of FIG. 2 and the signal thereon is coupled by way of capacitor 32 to a conventional emitter follower stage composed of transistor 36 and resistors 34, 35, and 37 connected as shown to negative potential source 33. The signal on the emitter of transistor 36 is directly coupled to the base of transistor 38 which in turn is connected in a conventional common emitter amplifier configuration with the primary of transformer 42 connected as the collector load. The gain of the transistor 38 amplifier stage is adjusted by the setting of the arm on potentiometer 40 connected in the emitter circuit of transistor 38. Moving the arm of potentiometer 40 toward the emitter of transistor 38 causes capacitor 39 to by-pass a larger portion of the series resistance combination of potentiometer 40 and resistor 41, thereby decreasing the amount of negative feedback within the stage, and correspondingly increasing the gain of the stage.

The secondary of transformer 42 couples the signal to a full-wave rectifier bridge circuit composed of diodes 44, 45, 46, and 47. As is well known in the art, this type of diode bridge circuit provides an output signal whose fundamental frequency is twice that of the input signal; hence the term frequency doubler is sometimes used to characterize the operation of this diode circuit. As utilized in the present invention, the diode bridge circuit provides a means of distorting the intelligence portion of the signal (i.e., speech) while not producing a discernible change in the noise.

Varistor 49 is connected as a load to the above-identified diode bridge circuit for the purpose of amplitude limiting the signal. This voltage limiting action of a varistor is well known in the art. For all voltage amplitudes below the predetermined voltage level associated with a particular varistor as its cut-off level, the varistor exhibits a substantial impedance; for all voltage amplitudes above that level, the varistor exhibits a very low impedance. Accordingly, the signal presented to varistor 49 by the above-identified diode bridge circuit is limited to the predetermined voltage cut-off level of varistor 49. This limited signal is coupled by transformer 50 to output terminals 51 which in turn are connected to attenuator 26 of FIG. 1.

If the diodes in the bridge circuit were ideal in that they presented a constant low impedance for all values of forward biasing voltage, limiter 25 would have, as is desired, a linear gain characteristic for all signals lower in amplitude than the predetermined limiting level. Diodes actually used, however, were found at low forward biasing voltages to have a substantial impedence which is the function of the magnitude of the forward biasing voltage. As a result, limiter 25, without resistors 43 and 48, was found to have a nonlinear gain characteristic for signals below the limiting level. In order to minimize the effect of this impedance variation found in actual diodes at low signal levels and produce a linear amplifier characteristic for low level signals, resistors 43 and 48 are connected across diodes 44 and 47 respectively, thereby providing a constant impedance for low level signals. When using a Western Electric varistor 100A as varistor 49, a Western Electric diode 400A for each of the diodes 44, 45, 46, and 47 and Western Electric transformers numbered 2586F and 2532A for transformers 42 and 50 respectively, a value of 10,000 ohms was experimentally determined to be an optimum value for each of the resistors 43 and 48.

As indicated hereinabove, the predetermined voltage level to which varistor 49 limits a signal placed across it is a constant for any given varistor. In order to change the voltage level on the signal from path 15 at which limiting action takes place, the gain of limiter 25 is adjusted by means of potentiometer 40. Attenuator 26 connected in the input of limiter 25 (FIG. 1) is adjusted for each setting of potentiometer 40 so as to produce an over-all gain of unity in the amplifier 30, limiter 25, and attenuator 26 path. As a result, the level of the noise coupled through contact 29 is the same as the level of the noise on path 15 at the input to amplifier 30.

What has been described hereinbefore is a specific illustrative embodiment of the principles of the present invention. It is to be understood that numerous other arrangements of physical parts and different component parts may be utilized with equal advantage. For example, it will be readily appreciated that amplifier 30 does not have to be used as a part of the by-pass circuit. The input of limiter 25 could be connected directly to the junction of path 15 and amplifier 30 if the voltage limiting device in limiter 25 had a predetermined voltage level of clipping within the same order of magnitude of the noise level on path 15 at the input of amplifier 30.

What is claimed is:

1. In apparatus for suppressing echoes in a two-way communications system having incoming and outgoing one-way paths subject to the presence of transmission noise, means for differentially responding to the amplitude of signals in both of said one-way paths, limiter means responsive to the differential response of the latter means for clipping the incoming signals at a predetermined level, said level being substantially equal to the noise level on said incoming path.

2. Apparatus as defined in claim 1 wherein the limiting means includes a means for frequency multiplying said incoming signals.

3. Apparatus as defined in claim 2 wherein said means for frequency multiplying said incoming signals includes four diodes in a full-wave rectifier bridge circuit, and said limiting means further includes a varistor connected at the output of said bridge circuit.

4. Apparatus as defined in claim 3 wherein said means for frequency multiplying said incoming signals further includes two resistors each one of which is in parallel with a diode in said four diode bridge circuit, the two parallel diode and resistor combinations being in opposite sides of said bridge circuit.

5. In apparatus for suppressing echoes in a two-way communications system having incoming and outgoing one-way paths subject to the presence of transmission noise, means for differentially responding to the amplitude of signals in both of said one-way paths, first means responsive to the differential response of the latter means for disabling transmission over said incoming path, means for amplitude limiting at a predetermined level, second means responsive to said differential response for connecting said limiting means in parallel with said disabling first means, whereby transmission over said incoming path is disabled only for amplitude portions of the signals thereon which exceed said predetermined level.

6. Apparatus as defined in claim 5 wherein said amplitude limiting means includes means for frequency doubling the signals on said incoming path.

7. Apparatus as defined in claim 6 wherein said frequency doubling means includes four diodes in a full-wave rectifier bridge circuit, and said limiting means further includes a varistor at the output of said bridge circuit.

8. Apparatus as defined in claim 7 wherein said frequency doubling means further includes two resistors each one of which is in parallel with a diode in said four diode bridge circuit, the two parallel diode and resistor combinations being opposite sides in said bridge.

9. Echo suppressor apparatus at one end of a two-way communications system having incoming and outgoing one-way transmission paths subject to the presence of transmission noise, said apparatus comprising means for differentially responding to the amplitude of signals in both of said one-way paths, means responsive to the differential response of the latter means for disabling transmission in said outgoing path when the signal is stronger in said incoming path, and limiter means responsive to said differential response for clipping the signals on said incoming path at a predetermined level when the signal is stronger in said outgoing path, said level being substantially equal to the noise level on said incoming path.

10. Apparatus as defined in claim 9 wherein said limiting means includes a varistor having a predetermined cut-off voltage, an adjustable amplifier having an input and an output, means connecting said varistor to the output of said amplifier, and means connecting the input of said amplifier to said incoming path, the gain of said adjustable amplifier being set so as to raise said predetermined level on said incoming path to the predetermined cut-off voltage of said varistor.

11. Apparatus as defined in claim 10 wherein said amplifier includes a means for frequency doubling the signal presented at the input to said amplifier.

12. Apparatus as defined in claim 11 wherein said means for frequency doubling includes four diodes in a full-wave rectifier bridge circuit.

13. Apparatus as defined in claim 12 wherein said means for frequency doubling further includes two resistors each one of which is in parallel with a diode in said four diode bridge circuit, the two parallel diode and resistor combinations being opposite sides in said bridge.

References Cited

UNITED STATES PATENTS 3,128,353 5/1964 Gardner ------------ 179—170.6

KATHLEEN H. CLAFFY, Primary Examiner

W. A. HELVESTINE, Assistant Examiner